United States Patent
Stählin et al.

(10) Patent No.: US 8,688,376 B2
(45) Date of Patent: Apr. 1, 2014

(54) VEHICLE-TO-X COMMUNICATION BY MEANS OF RADIO KEY

(75) Inventors: Ulrich Stählin, Eschborn (DE); Lutz Breyer, Feldkirchen (DE); Markus Aunkofer, Abensberg (DE); Peter Säger, Friedrichsdorf (DE)

(73) Assignees: Continental Automotive GmbH (DE); Continental Teves AG & Co. oHG (DE)

( * ) Notice: Subject to any disclaimer, the term of this patent is extended or adjusted under 35 U.S.C. 154(b) by 0 days.

(21) Appl. No.: 13/529,435

(22) Filed: Jun. 21, 2012

(65) Prior Publication Data
US 2013/0158862 A1    Jun. 20, 2013

Related U.S. Application Data

(63) Continuation of application No. 13/319,444, filed as application No. PCT/EP2010/056108 on May 5, 2010, now abandoned.

(30) Foreign Application Priority Data

May 11, 2009  (DE) .......................... 10 2009 003 009

(51) Int. Cl.
*H04B 1/38* (2006.01)
*G08G 1/133* (2006.01)

(52) U.S. Cl.
USPC ....... 701/517; 701/515; 701/431; 340/426.36

(58) Field of Classification Search
None
See application file for complete search history.

(56) References Cited

U.S. PATENT DOCUMENTS

| | | | |
|---|---|---|---|
| 5,635,923 A | 6/1997 | Steele et al. | |
| 6,615,137 B2 * | 9/2003 | Lutter et al. | 701/301 |
| 6,759,942 B2 * | 7/2004 | Bedi et al. | 340/5.72 |
| 7,382,274 B1 * | 6/2008 | Kermani et al. | 340/901 |
| 2006/0077037 A1 * | 4/2006 | Luo et al. | 340/5.72 |
| 2011/0098877 A1 | 4/2011 | Stählin et al. | |

FOREIGN PATENT DOCUMENTS

| | | |
|---|---|---|
| DE | 10 2009 045 816 | 4/2010 |
| EP | 1 216 890 | 6/2002 |
| WO | WO2008/154747 A1 * | 12/2008 |
| WO | WO2009/074655 | 6/2009 |

OTHER PUBLICATIONS

"Car 2 Car Communication Consortium Manifesto", Car 2 Car org, XP002593958, http://www.car-to-car.org, Aug. 28, 2007.
International Search Report for PCT/EP2010/056108 filed Jul. 28, 2010, mailed Aug. 11, 2010.

* cited by examiner

*Primary Examiner* — Michael J Zanelli
(74) *Attorney, Agent, or Firm* — RatnerPrestia

(57) ABSTRACT

The invention relates to wireless vehicle-to-X communication by means of radio key (RKE) with a transceiver. The radio key transceiver is designed to send and receive not only data associated with the keyless driving authorization but also vehicle-to-X communication data. The radio key X communication can be used between two vehicles equipped with this radio key communication technique in order to communicate data such as positions, weather conditions or warnings quickly and reliably. This wireless communication technique using radio keys can also be used for coordinating emergency services when searching for an accident scene.

15 Claims, 7 Drawing Sheets

VEHICLE-TO-X COMMUNICATION BY MEANS OF RADIO KEY

CROSS REFERENCE TO RELATED APPLICATIONS

This application is a Continuation Application of application Ser. No. 13/319,444, filed Nov. 8, 2011, which is the U.S. National Phase Application of PCT/EP2010/056108, filed May 5, 2010, which claims priority to German Patent Application No. 10 2009 003 009.3, filed May 11, 2009, the contents of such applications being incorporated by reference herein.

FIELD OF THE INVENTION

The invention relates to a communication apparatus for radio key vehicle-to-X communication for a vehicle, to a vehicle having a communication apparatus, to a method for radio key vehicle-to-X communication, to a program element and to a computer-readable medium.

BACKGROUND OF THE INVENTION

Modern vehicles are frequently equipped with keyless entry systems or radio keys, what is known as Remote Keyless Entry (RKE). These radio keys control the locking and unlocking of doors and the trunk of a motor vehicle by radio control. In this way, the vehicle door locks of a motor vehicle can be opened and closed wirelessly. Further functions can be activated and deactivated using a radio key, such as the engine immobilizer.

A radio key system comprises a vehicle-based receiver or a vehicle module and one or more mobile transmitters which can be held in the hand, for example. In this case, the transmitter or the portable module may be provided with one or more manually operatable switches. In addition, there are radio keys from newer generations which involve the radio key no longer being taken into the hand, but rather involve the vehicle-based transmitter registering the proximity of the key to the vehicle and unlocking the door lock as a result of the door handle being touched by the driver, for example. Dispensing with manual inputs via the radio key transmitter becomes possible through the use of what is known as bidirectional communication. Unlike in the case of conventional radio key central locking, the radio key transmitter not only sends signals to the locking system but also receives information from the locking system. In this case, the radio key transmitter is in the form of a transceiver. Using what is known as passive start and entry (PASE), the doors unlock simply as a result of the door handle being touched, and the engine can be started at the touch of a button without a key. In this case, the vehicle-based transceiver has a memory which stores an identification code which can identify the radio key transmitter.

The interchange of information with different vehicles which are involved in the traffic and between vehicle and infrastructure can, in future, contribute to increasing the safety of road users and the comfort of the vehicle driver. This communication from vehicle to vehicle and from vehicle to infrastructure, which is subsequently called vehicle-to-X communication (C2X communication), can be used only if a certain proportion of the vehicles or infrastructure units involved are equipped with appropriate communication units which are based on the same technology. Particularly in the case of rapidly changing communication technology and on the basis of the price expectations of the vehicle drivers, the additional outlay—linked to upgrading the vehicles—for providing and installing such a communication unit may be too high. Therefore, simple and inexpensive solution options are needed which can make vehicle-to-X communication available to a large number of vehicle keepers.

In addition, it is known that emergency vehicles such as fire trucks, ambulances or the like are reliant on well-functioning communication when on an assignment. Vehicle-to-vehicle or vehicle-to-control communication techniques are necessary here, in order to be able to transmit messages to other emergency services and to be able to quickly coordinate the rescue operation.

When an emergency call is received at an emergency call center, for example by means of a telephone call, without a precise position statement, the emergency call center sends out emergency services. Frequently, the position statement from the calling parties is not precise enough and the rescue workers first of all need to find the casualties or an object which needs to be sought on site. For this purpose the search parties may have transmitting equipment such as radio telephony available, for example. However, coordination by radio telephony is in practice sometimes inaccurate or does not work or does not work well enough. There is therefore a need for vehicle-to-vehicle communication in the case of emergencies which works reliably.

SUMMARY OF THE INVENTION

It is an aspect of the invention to provide vehicle (Car to X or C2X) communication, on the basis of already existing vehicle technologies.

This aspect is achieved by a communication apparatus for radio key vehicle-to-X communication, a vehicle having a communication device for radio key vehicle-to-X communication, a method for radio key vehicle-to-X communication, and a program element and a computer-readable medium in accordance with the features of the independent claims. Developments of the invention can be found in the subclaims.

The exemplary embodiments described below relate to the communication apparatus, the vehicle, the method, the program element and the computer-readable medium in equal measure. In other words, features which are described below for the communication apparatus, for example, can also be implemented as method steps, and vice versa.

In accordance with one exemplary embodiment of the invention, a communication apparatus is specified for a vehicle, said communication apparatus having a radio key device (RKE or Remote Keyless Entry) having a vehicle module or radio key receiver and a portable module or radio key transmitter. The vehicle module and/or the portable module is/are in the form of a transceiver, the transceiver being designed for wirelessly receiving and sending vehicle-to-X communication data to a further vehicle or an infrastructure.

In this way, car-to-X applications can be made available via the radio key. Since radio key engineering is already implemented in a large number of vehicles, the communication by radio key can be introduced to vehicle-to-X very easily and quickly. It is therefore also possible to reduce the development risk. By way of example, the position of a vehicle can be transmitted cyclically by the vehicles, for example in combination with a time stamp and identification numbers, using the radio key. On this basis, the other vehicles which also have this technology can obtain information about their adjacent vehicles.

In addition, other vehicles can forward warnings to the other car passengers. If this car-to-X functionality is introduced in the radio keys of emergency vehicles, it is also possible for search parties and services to be coordinated by this means. The car-to-X functionalities can be implemented either in the vehicle or in the external radio key transmitter, which is in the form of a transceiver.

The vehicle-to-X communication can take place with other vehicles which have this radio key technology and car-to-X implementation. In this case, the further vehicles should be situated within a predetermined range. A further option for transmitting data further than a particular range of a radio key to the next is a storage and forwarding system, what is known as the store-and-forward system. A suitable memory in the radio key device can be used to store the desired communication data and to transport them onward to a vehicle which is further away via an intermediate station or vehicle. In this way, it is possible to bridge gaps which can arise from a small number of road users equipped with C2X technology or from a small number of suitable infrastructure devices.

In accordance with a further exemplary embodiment of the invention, a communication apparatus is provided which has an interface to a position-finding unit for creating position data for an adjacent vehicle.

For functionality of the car-to-X communication via the radio key, it is crucial to be able to produce relative positioning in comparison with the other communication parties or vehicles. To this end, it is possible to use GPS, for example, in combination with compound navigation (Dead Reckoning) or comparable technologies, for example. Compound navigation involves the position of the vehicle being ascertained by measuring a direction of movement, the vehicle speed and time.

Further positioning technology which can be used is also distance measurement by means of field strength measurement. Following combination with the measured direction of travel for the vehicle, e.g. on a digital compass, it is in this way possible to establish precisely where the vehicle is situated in relation to the other vehicle. This would allow a threatened risk of collision between two vehicles to be reported to the vehicles immediately. This can significantly increase the safety of road users.

In accordance with a further exemplary embodiment of the invention, the car-to-X communication data are selected from a group comprising position data, time stamps, surroundings data, warning signals, identifier data, speed data, direction data and further information data.

In this case, the position data relating to relative positioning of the vehicles and infrastructures can be communicated to the vehicles which are involved in the car-to-X communication. By way of example, the statement of surroundings data allows information such as the position of an obstacle, which information can be received from ambient sensors, to be made available to a vehicle driver for warning purposes. In addition, it is also possible to output warning signals when there is drop below a particular temperature, for example, which means that black ice can be expected. Communication data such as time stamp, position, direction-of-travel data and speed data can determine the relative positioning very precisely and report queues or threatened collisions to the road users, for example, in good time or in advance.

In addition, it is important to send identifier data in order to ensure the safety or data integrity of the subscribers to the car-to-X communication. In this way, the transceiver can explicitly identify, from a multiplicity of transmitters, whether there is a match with a valid security or identification code. The identifier data also allow personalization of the functions of a radio key device system for selected persons or groups. By way of example, emergency vehicles may have different identification codes than normal road users, as a result of which the information from emergency call centers is also sent only to the desired addressees. In this way, appropriate processing of the data to be sent can result in greater confidence in the subscribers using the communication.

Within the context of further information data, the radio key can be used to provide the vehicle with traffic flow data such as queue reports, roadworks, possible diversions or warning information about emergency vehicles, road weather, queue end and also infotainment such as internet data or position information.

In accordance with a further exemplary embodiment of the invention, a communication apparatus is provided, wherein the vehicle is an emergency vehicle which, after finding an accident scene, sends its position data as a locating signal via the communication apparatus to further emergency vehicles for the purpose of coordinating the operation.

When an emergency vehicle finds the sought object or the sought person, it is in this way able to forward a signal to the further vehicles involved in the operation using wireless radio key engineering (RKE). In this way, it is possible to ensure rapid aid at the accident scene. The signal can send the position of the emergency vehicle, such as the GPS position, road name or characteristic local circumstances, to the other vehicle in the operations group. The signal from the search party may also include whether all objects or persons being sought have been found, or only some of them. If only some have been found, the other search parties can concentrate the rest of the search on the area around the site of the initial find, or can adapt the search criteria on the basis of the site of the first find. Instead of the emergency vehicles, it is also possible to equip individual persons in the search parties with mobile RKE modules, as a result of which the communication can also take place between individual persons and these do not first need to return to the vehicle when they are out and about on foot.

In accordance with a further exemplary embodiment of the invention, a communication apparatus is provided which also has a display apparatus which is designed to receive and display vehicle-to-X communication data.

In this way, the bidirectional communication of the radio key can be improved not only by the extension to the car-to-X communication but also by the employment of display technologies. Thus, these displays can be used to display positions of the other vehicles to the radio key. Displays such as whether the vehicle is unlocked or locked, the lights are still on or off, the tank content or a series of other information can likewise be displayed on request on the display of the radio key. Instead of a small display on the radio key itself, it is also possible to provide display apparatuses which are connected to the vehicle computer systems. Thus, by way of example, the display of a navigation system could be used in order to be able to display data from the vehicle-to-X communication too. In this way, it is possible to use already existing displays associated with the vehicle.

In accordance with a further exemplary embodiment of the invention, a communication apparatus having a vehicle-based navigation system is provided, said vehicle-based navigation system being designed to receive the locating signal and to display destination guidance on a digital map on the display apparatus.

In this way, it is possible to coordinate search parties, for example, and to guide them to the accident scene on the shortest route, since the position of the sending search party can be displayed on a digital map and navigation can be used for route guidance. So that only search parties which are actually involved in the operation receive the signal, it is additionally possible to integrate an identifier into the signal.

Other road users can also be warned that an emergency vehicle is approaching, and can thus clear the approaches in good time.

In addition, other vehicles using the vehicle-to-X communication can direct information about queues into their navigation systems and therefore initiate other destination guidance to the destination. In the event of an acute risk of black ice, for example, it would be possible to send the information regarding which roads have already been treated and then also to adapt the destination guidance in the navigation system accordingly.

In accordance with a further exemplary embodiment of the invention, the vehicle-to-X communication data can additionally also be received and transmitted on the basis of further communication technique with a higher bandwidth from the receiver and transmitter on the basis of a standard format.

If only a few vehicles which are equipped with a radio key device are extended by the functionality of car-to-X, a low bandwidth with data rates of typically up to 20 kbit/sec is sufficient to be able to present the car-to-X applications. However, if more and more vehicles have car-to-X applications using a radio key device, the data rate could no longer be sufficient. In this case, it is possible to add a second communication channel on the basis of further communication technique with a higher bandwidth. This possibility of communication with a higher bandwidth can be made available to the vehicles directly in the factory in the case of new vehicles. In the case of vehicles which are already on the market, this can be done by means of retrofitting or by means of exchange, i.e. for an intelligent antenna, this antenna containing a transceiver.

Retrofit appliances for car-to-X communication can be based on dedicated short range communication (DSRC), which uses the communication standard IEEE 802.11p, for example, and has a high data rate of between 3 and 27 Mbps. DSRC is a bidirectional radio technique for vehicle-to-vehicle communication or vehicle-to-static-appliance communication. DSRC has a short to medium range with a short access time and high data rates. A known IEEE DSRC standard is IEEE 802.11p, which is deemed to be the favored technology of car-to-car communication and can be extended by the 802.11a standard for use in vehicle-to-X communication networks. In this case, the frequencies should be able to be chosen such that they are compatible with standards in other countries, such as Europe or possibly the USA.

In addition, the complementary communication standard used should cover multiple vehicle manufacturers in order to provide wireless communication in road traffic as comprehensively as possible for vehicles equipped with this communication channel. In this case, the planned frequency band could be 5.850 to 5.925 GHz, as has already been reserved for use in the field of traffic for the USA. This 75-MHz frequency band can be used to provide a plurality of channels, with one channel being reserved for "normal" car-to-car communication, for example, and another channel being reserved for safety-critical communication, such as with emergency vehicles.

Car-to-X communication by means of radio key can preferably take place using a physical layer or Medium Access Layer PHY/MAC layer according to the IEEE802.15.4-2006 standard. The physical layer PHY controls the RF transceiver and makes channel selections and performs signal management. Using the IEEE802.15.4-2006 standard, it is possible to use license-free ISM bands and to effect parallel operation with other transmitters on these frequencies, particularly wireless LAN. The frequency used can either be one of the ISM bands, such as 443 MHz or 868 MHz, or a dedicated frequency band in the range between 870 MHz and 876 MHz. The 2006 version improves the maximum data rate of the 868 MHz bands to 100 kBit/s.

In this way, it is possible to provide important services for the vehicles with regard to traffic safety and traffic information, and also to ensure faster coordination of emergency vehicles.

In accordance with a further exemplary embodiment of the invention, the further communication technique is selected from a group comprising WLAN engineering based on IEEE802.11 standards, cellular radio based on GSM, UMTS, LTE, WiMAX and communication technique based on DSRC.

The cited communication techniques can use vehicle-to-X communication for intelligent transport systems (ITS). ITS is the generic term for the integration of information technologies into transport systems. A possible architecture for ITS could in future be standardized by the European Telecommunications Standards Institute (ETSI) and be embedded in the relevant communication networks.

For vehicle-to-X communication, implementation based on the 802.11p standard is conceivable. This standard is distinguished by the opportunity for ad hoc communication and long ranges and also affords high data transmission rates in general. If an architecture which is actually intended for IEEE 802.11p is used, it is possible to forward the data in a form which corresponds to the ITS architecture, so that in the order of events it is not possible to identify any difference from the data which have been received using IEEE 802.11p. This also results in problem-free transition between radio key communication technique and IEEE 802.11p.

A smooth transition to IEEE 802.11p is possible if car-to-X using radio key communication uses messages based on the current ETSI standardization. In this case, the same scheme of messages and meaning thereof are used. Another possibility for message definition is the ITS standard program SAE J2735, which can be used for 5.9 GHz DSCR.

Vehicle-to-vehicle communication can also be effected using the 802.11a/b/e/n standards. In addition, it is possible to use data which are already being provided by travel and traffic information (TTI). Thus, data from road monitoring sensors or the traffic message channels of the radio data system (RDS-TMC) can be received and handled by the radio key device. Almost all midrange cars which have a navigation system can receive RDS-TMC.

The start of vehicle-to-X communication by means of radio key and the only later supplementation by other communication techniques can allow a very fast introduction scenario on the basis of existing technologies. In addition, the development risk is reduced for the quickly changing communication techniques.

In accordance with a further exemplary embodiment of the invention, the vehicle-to-X communication data comprise an identifier which indicates what further communication technique is integrated in one or more vehicles.

In order to identify, in what is known as a transition time, whether a vehicle is only equipped with low bandwidth radio key communication or already has the high data rate of the IEEE802.11p standard, for example, the radio key can be used to send an appropriate identifier. This identifier indicates whether the vehicle in question also has the IEEE802.11p standard installed in it in parallel with the radio key car-to-X communication function. This identifier can easily be sent along in a bit in the communication header. For a high data rate, it is possible to resort to the further communication module if necessary. When an exclusive radio key system is identified, the data from the radio key car-to-X communication on the RKE channel can be reduced.

Preferably, the driver is also provided with an indication of what expansion level is provided in his vehicle and how well equipped are his surroundings or the other vehicles in range. By way of example, the driver could be provided with an indication of what percentage of car-to-X partners are equipped with IEEE802.11p. This information can also be used as a purchase incentive for vehicle keepers who have not yet installed or implemented this extension.

In accordance with a further exemplary embodiment of the invention, the communication apparatus has a memory unit for providing vehicle-to-X communication data.

Particularly when equipment rates are low, it is important to have what is known as a memory function available. In this way, information about a very close vehicle which also has C2X communication functions can be sent to a vehicle which is further away by buffer-storing the information and forwarding it to the respective destination vehicle or infrastructure station at a later time. This "store-and-forward" method thus involves setting up a radio link between information source and information destination via forwarding vehicles.

The "store-and-forward" function can be used by the communication unit to receive, buffer-store and re-output data when a further communication subscriber with the relevant communication technique comes into proximity. So as also to be able to carry the information further in the introduction phase when equipment rates are low, the communication data can be forwarded to the opposite lane on board vehicles too. Thus, by way of example, a vehicle which is stationary in a queue can report the existence of the queue to a further vehicle in the opposite lane, whereupon the second vehicle takes away this information and can pass it on after some time to a third vehicle in the queuing lane. It is thus possible for the vehicle to be made aware of the queue in good time and to react accordingly.

The store-and-forward function can provide vehicle drivers with a decentralized, self-organizing traffic information system, wherein a digital map with a positioning system, for example GPS, and a wireless ad hoc communication technique between the vehicles can be used. This method is faster and usually more up to date than a conventional traffic information system, which is usually organized centralistically, with time delays in the new reports and currentness problems in the transmitted information possibly arising. An example of a conventional central information system is transmission by means of RDS, which the vehicle driver can receive using his radio.

Vehicle-to-vehicle communication can be used by the vehicles to inform one another about the local traffic situations. In this case, the traffic situation can be analyzed by every single vehicle as soon as it comes into the range of an information carrier and transmitter. Any information which a vehicle outputs can be specified by a time stamp. In this way, hazardous situations can be identified in advance and, by way of example, the position of a poorly visible queue end can be displayed to the driver for warning purposes.

In accordance with a further exemplary embodiment of the invention, the communication apparatus also has a microprocessor for processing the vehicle-to-X communication data, and for executing communication stacks, wherein the data have a standard format for an intelligent transportation system. The standard protocol used or the stack design should be developed particularly for wireless communication. The stack architecture, inter alia, can produce the connection setup and can continuously check whether the connection continues to exist.

In the case of car-to-X communication by means of the radio key, raw data can be forwarded to a microprocessor, which processes these data and can execute communication stacks. This processor may be integrated in the radio key module itself and, besides the car-to-X function, can also execute the usual functions of a radio key itself. On the basis of this synergistic effect, a single processor can be used for a plurality of functions.

So as still to be able to make changes or further developments to the communication or communication stacks even after the introduction of the first communication systems, which have a radio key car-to-X functionality, it is possible to make large portions of the communication stack renewable by means of software. Thus, in particular, the communication protocol can be matched to future requirements.

In accordance with a further exemplary embodiment of the invention, customization of a piece of operating software in the communication apparatus can be executed by means of the portable module and/or direct radio communication to the vehicle module.

In this case, the radio key device software can be updated firstly by means of the mobile and portable module or radio key transmitter. A computer can install a piece of software via the portable module of the radio key and can then transfer it to the radio key hardware. Secondly, it is possible to provide the opportunity of setting up direct radio diagnosis communication via the vehicle module so as in this way to execute a software update for the radio key device in similar fashion to a conventional update using a diagnostic connector.

In accordance with a further exemplary embodiment of the invention, the radio key apparatus has a mid-range or long-range front end.

This ensures good scalability. The different front ends can be used in order to achieve various ranges. In the case of ordinary radio key devices, these front ends typically have the designation midrange or long range for medium and long ranges, respectively. The range of midrange RKE systems is usually up to 100 m, whereas long range applications provide the data transmission over distances of several 100 m. Thus, by way of example, inexpensive vehicles or vehicles from the lower price segment can be equipped with a shorter range than vehicles from higher price classes, for example. The use of these different front ends allows the vehicles to communicate with one another irrespective of the vehicle class.

In accordance with a further exemplary embodiment of the invention, a vehicle having a communication apparatus is provided, said communication apparatus having a radio key device with a radio key receiver and a radio key transmitter, wherein one of the components is in the form of a radio key transceiver for the purpose of wirelessly receiving and transmitting vehicle-to-X communication data.

In accordance with a further exemplary embodiment of the invention, a method for vehicle-to-X communication is provided, involving: reception and transmission of vehicle-to-X communication data by a transceiver.

This means that the radio key is designed not only to receive data from a portable module in order to initiate keyless driving authorization but also to receive and send vehicle-to-X communication data. A suitable memory can be used to store these vehicle-to-X communication data too. A suitable connection to the hardware of the radio key also allows vehicle-based data to be transmitted wirelessly or by wire from the vehicle and to be forwarded to the outside if appropriate. Examples of transmission techniques used in this context are Bluetooth, USB, Wireless LAN or other transmission media. Thus, by way of example, the information about the tank fill or internal vehicle temperature can be forwarded to the driver. In a similar manner to vehicle diagnoses, suitable personnel can be used to evaluate vehicle data in order to be able to provide rapid assistance in the event of breakdown on account of malfunctions in the vehicle. Suitable identification codes can be used to allow only experts to read the analysis data by means of radio key.

In accordance with a further exemplary embodiment of the invention, a program element is provided which, when executed on a microprocessor in a communication apparatus, instructs the microprocessor to perform a method for vehicle-to-X communication using a radio key device.

In accordance with a further exemplary embodiment of the invention, a computer-readable medium is provided which stores a program element which, when executed on a microprocessor in a communication apparatus, instructs the communication apparatus to perform a method for vehicle-to-X communication using a radio key device.

Exemplary embodiments for the purpose of further illustration of the invention are described by way of example below with reference to the figures.

BRIEF DESCRIPTION OF THE DRAWINGS

The invention is best understood from the following detailed description when read in connections with the accompanying drawings. Included in the drawings is the following figures.

DETAILED DESCRIPTION OF THE PREFERRED EMBODIMENTS

The illustrations in the figures are schematic and not to scale.

Figure 1:
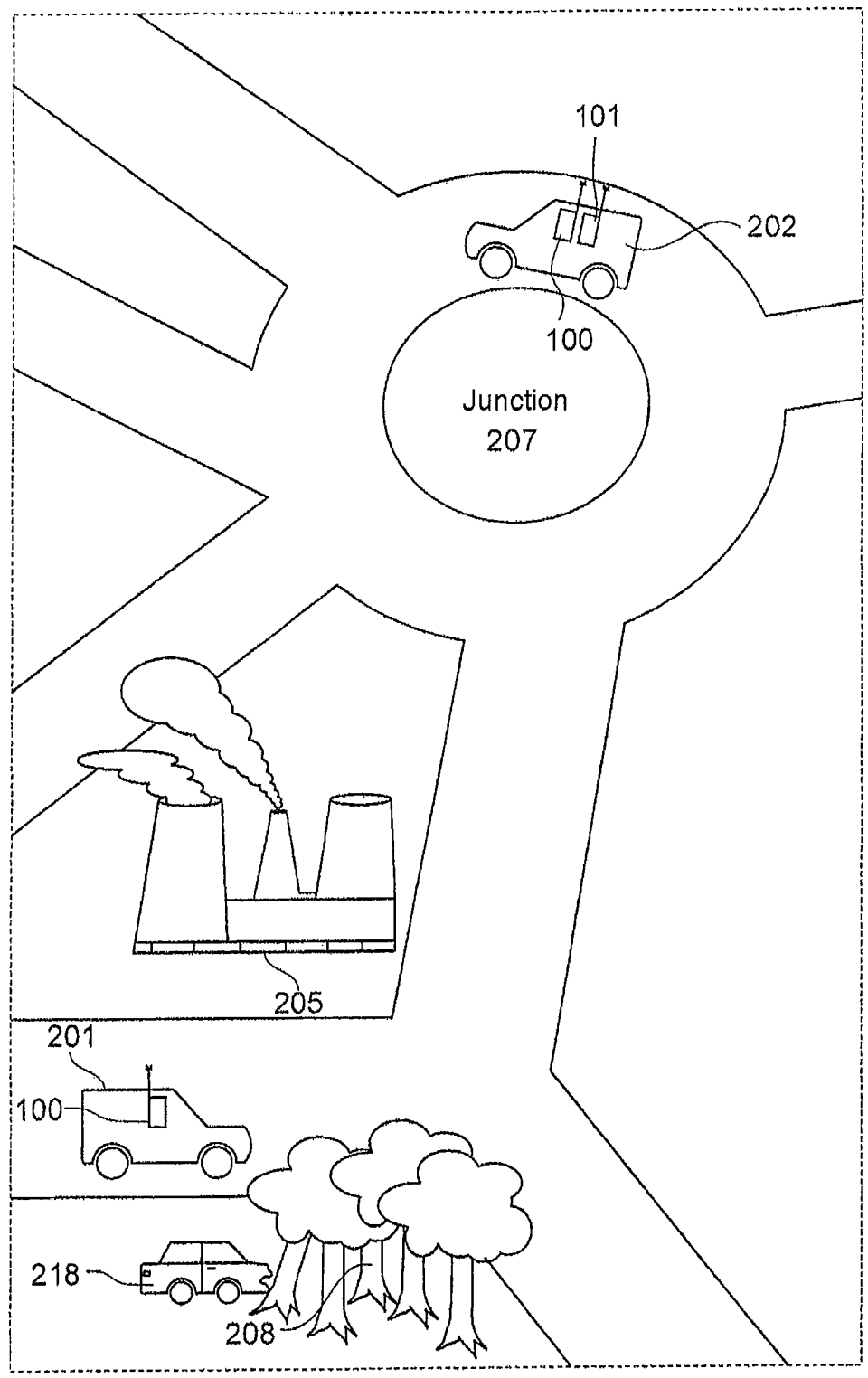
FIG. 1 shows emergency vehicles with a radio-key-based communication apparatus for coordinating the search parties at a junction with poor visibility.

FIG. 1 shows two emergency vehicles 201 and 202 with a communication apparatus 100. The emergency vehicles may be vehicles belonging to a fire brigade or an emergency doctor, for example, which have been called to an accident. The car 218 involved in the accident has reported an accident at the junction 207. However, the accident scene is behind a group of trees 208 which is remote and invisible from the reported junction 207. The emergency vehicle 202 which is at the junction establishes that the junction is very large and that there is no accident at said junction, however. The emergency vehicles then spread out in order to find the accident.

FIG. 1 shows that an emergency vehicle 201 finds the accident in a side street close to the junction opposite a factory 205. The emergency vehicle 201 can then use wireless communication via the radio key device (RKE) 100 to transmit a signal which the other emergency vehicles involved in the search can receive. The signal is received by suitable transceivers which are located either on the radio key receiver or on the radio key transmitter of the radio key device 100. If the accident site is known, the other vehicles can likewise proceed to it. In addition, the vehicle 202 may have a further communication device 101, such as mobile radio or radio telephony, in order to be able to communicate with the deployment location leadership or other emergency vehicles. However, the radio telephony among the search parties is in practice frequently error-prone or the vehicle drivers or rescue workers in the emergency vehicle 201 cannot use the radio telephony, since they are administering first aid to the driver of the car involved in the accident. Particularly in the case of mobile radio, moving vehicles frequently have the problem of connections suddenly terminating or of significant reduction in the transmission quality.

In contrast to radio telephony, the radio key transmitter may be set such that it regularly transmits the accident scene which has been found. As soon as other emergency vehicles come into range of the transmitter, they can receive this information and, by way of example, supply it to their navigation appliances, so that accurate and safe destination guidance is provided.

Figure 2:
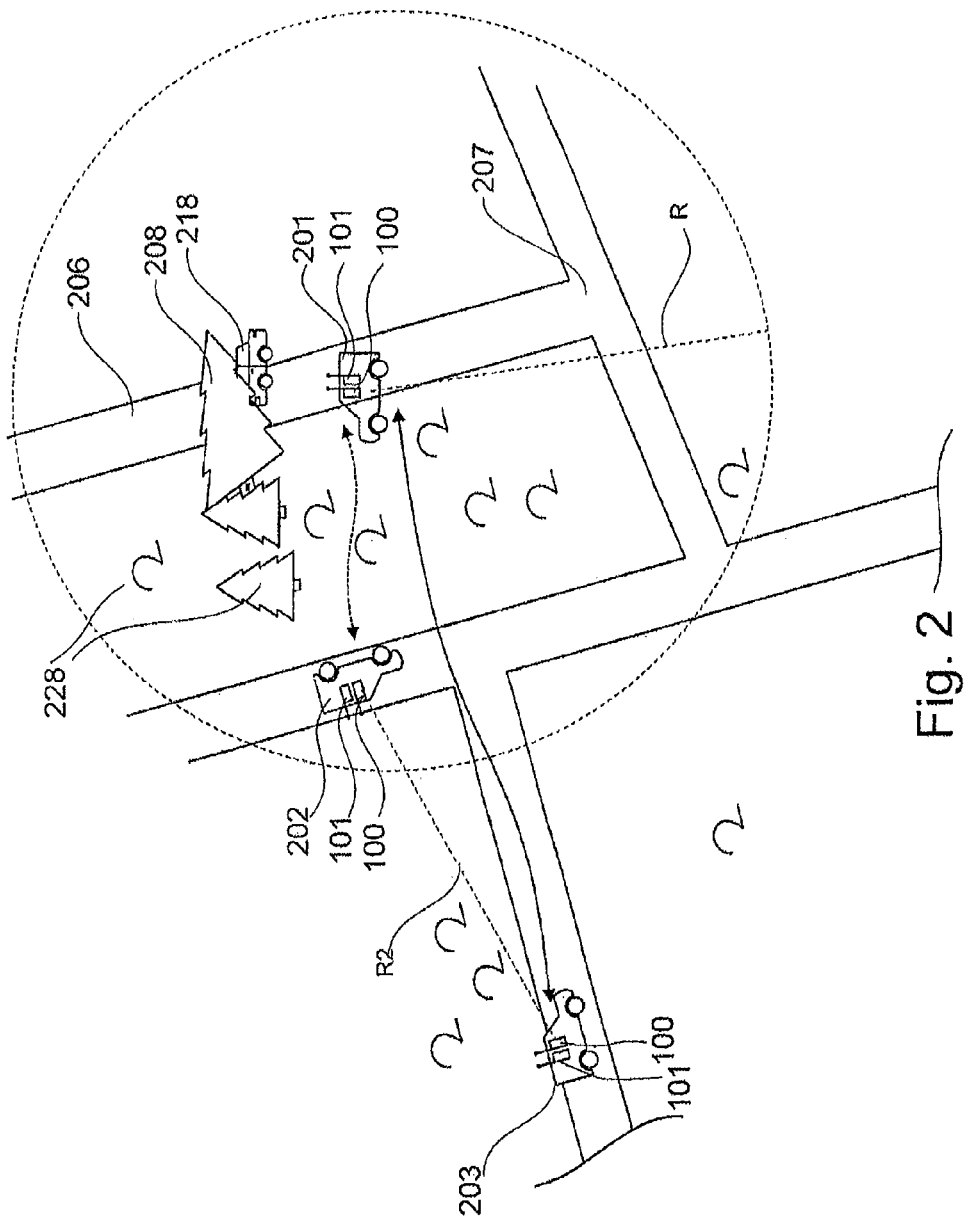
FIG. 2 shows the coordination of further emergency vehicles with two communication apparatuses.

FIG. 2 shows three emergency vehicles 201, 202 and 203. By way of example these emergency vehicles may be vehicles belonging to the fire brigade which are deployed in order to redress damage caused in the event of a storm. By dialing the emergency number 112, an accident and obstructions in the road can be reported to the emergency call center. However, there is no accident at the transmitted position, which means that the emergency services spread out in order to look for the accident. After some time, one search party, in this case the emergency vehicle 201, finds a person in a car which has been hit by a fallen tree 208.

The accident scene is remote from the originally reported location. This new information can be sent using a radio key device to the further search parties 202 which are within range R of the radio key transmitter or transceiver. The illustrated example shows a roadway 206 which leads to the junction 207 and is being blocked by the fallen tree 208. In this case, the car 218 involved in the accident can be reached only via the junction 207, since the fallen tree 208 is blocking access to the car. In order to be able to help the car occupants quickly and get them out of the car, for example, rapid coordination of the emergency services is necessary. The range R of the communication device 100 via the radio key device is shown in FIG. 2 by the dashed circle with the radius R. The emergency vehicle 202 is within range R of the radio key and can receive the information about the accident scene using the communication device 100, i.e. by means of keyless driving authorization.

In addition, relevant data such as the number of casualties or, in the case of fallen trees, access to the accident scene, namely that rescue is possible from one side only, can be reported. The position data and the access data relating to the accident scene can be forwarded to this vehicle easily and reliably by means of a radio key. The vehicle 202 can reach the accident scene quickly via the junction 207 using suitable position data and destination guidance data.

A further emergency vehicle 203 is outside of the range R of the radio key device, which means that in this case cellular mobile radio is used, for example, in order to inform the vehicle driver of the emergency vehicle 203. The cellular mobile radio is provided by the communication unit 101 and receives the data if the network for the mobile radio used has sufficient coverage in this remote area. It is possible to design the communication unit 101 using cellular radio GSM, EDGE, GPRS, UMTS and LTE, and also WiMAX. Many communication techniques are already used for mobile radio, which means that the necessary infrastructure for this may be present, depending on the region. The use of existing mobile communication techniques, such as the mobile radio networks, allows the communication to be maintained during the travel time of the vehicle. Cellular networks allow an opportunity to access a broad bandwidth of data services, such as internet access. The interface to the cellular radio can either be installed directly in the vehicle or can be effected wirelessly using a mobile telephone belonging to the vehicle driver.

However, particularly in remote regions or in severe bad weather, the problem arises that the mobile radio networks do not work at all or work inadequately, which means that reception may be relatively poor or can terminate during communication and a call. It is therefore advantageous to use the radio key device as a communication technique. In the present case, shown in FIG. 2, the information regarding where the accident scene is located and the better access can be forwarded to the emergency vehicle 203 by means of the radio key device 100. Thus, the information is reliably forwarded using store and forward by means of the radio key device of the car 202. The range R, which is identified by the radius of the circle, from the emergency vehicle 201 is sufficient in order to transmit the information to the emergency vehicle 202 (identified by the dashed arrow). The range R2 is sufficient to forward it to the emergency vehicle 203, which has a radio key device having the same range R2.

Other search parties (not shown) can receive this signal and then know immediately where the object being sought or the person involved in the accident who is being sought is located. They can themselves terminate their search and proceed directly to the accident scene. In this way, the other search parties can quickly find the accident scene and then concentrate the rest of the search if further people are still missing or damage relating to the accident has been reported. The use of radio-key-based communication devices 100 may therefore be favorable particularly on terrain which is not very clear or has inadequate network coverage, for example as a result of the accident taking place on wooded terrain with foliage and coniferous trees 228. In addition, the use of radio key devices is advantageous on mountainous terrain or in other areas in which cellular mobile radio occasionally does not work.

Figure 3:
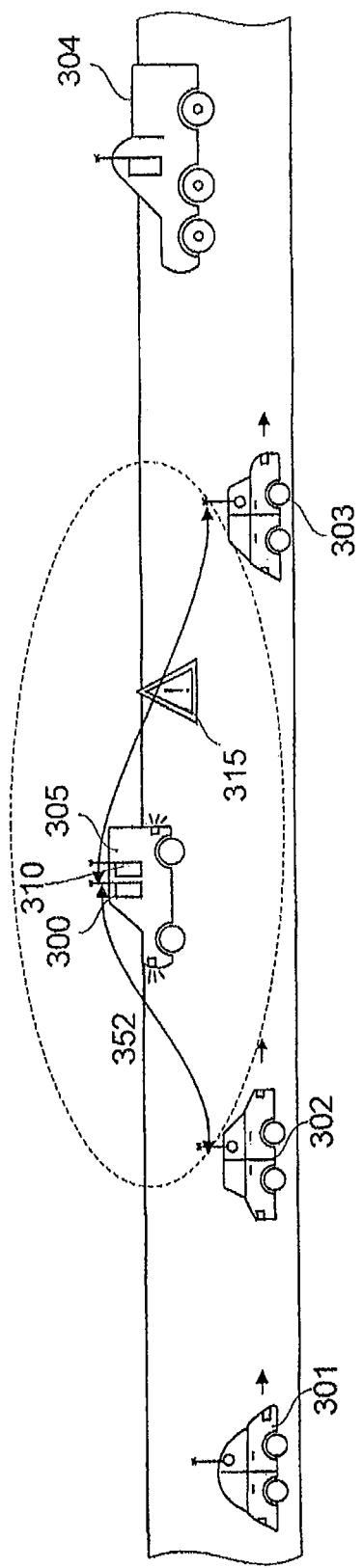
FIG. 3 shows further motor vehicles equipped with radio-key-based communication apparatuses with a storage function.

FIG. 3 shows an accident or broken down vehicle 305, which is identified by the warning triangle 315. The vehicle 305 involved in the accident is equipped with a communication device 100. The range of the radio key communication device 300 is indicated by the dashed circle. The information that this vehicle 305 involved in an accident has broken down can be received only by the closest vehicles. The double-headed arrows 352 and 353 show that the vehicles 302 and 303 are able to receive the information. The vehicles 301 and 302 and also 303 are situated in the opposite lane and can buffer-store the information and can convey the information about the accident to a vehicle 304 in the opposite lane which is further away from the accident.

This "store-and-forward" function can be used to close the gap which arises as a result of the limited range of the vehicle 305. This can naturally be done only if the vehicles are equipped with the appropriate communication technique and are passing the accident scene at the particular time. In this case, the radio devices 100 may have different ranges so long as the information is sent on using the same information standard.

Particularly when equipment rates are low, it is thus important to have a store and forward function available. In this case, the relevant radio key communication units receive the data, buffer-store them and output them again when a further communication subscriber approaches. Instead of an accident, which is shown in FIG. 3 in this case, there may also be a queue which needs to be indicated to the other road user. Thus, by way of example, it makes sense if a vehicle in the queue conveys the existence of the queue to a second vehicle in the opposite lane, this vehicle, in this case 303, accepts this information into the memory and, when it has reached the range of the vehicle 304, forwards it to the latter vehicle. This allows the vehicle 304 situated in the queuing lane to be made aware of the queue in good time and to react accordingly, for example to leave the queuing section if there is still an exit (not shown) available.

The memory module required can be provided either in the portable module or in the vehicle module. However, the radio key transmitter or the portable module of the keyless driving authorization system may be more sluggish at storage than the vehicle-based transceiver system of the vehicle module. By way of example, the mobile radio key transmitter can be used to store the information usually at 125 kHz. Therefore, one possible alternative is to keep the data directly in the vehicle-based radio key receiver and to provide them at that location for the memory with faster storage options.

In order to be able to fix the location of the queue or the accident precisely, the relative positioning in comparison with the road users is important for the vehicle-to-vehicle functionality using a radio key. To this end, GPS can be used, for example. An appropriate device 310 is shown in the vehicle 305, for example. This can be used to illustrate reception for satellites.

Figure 4:
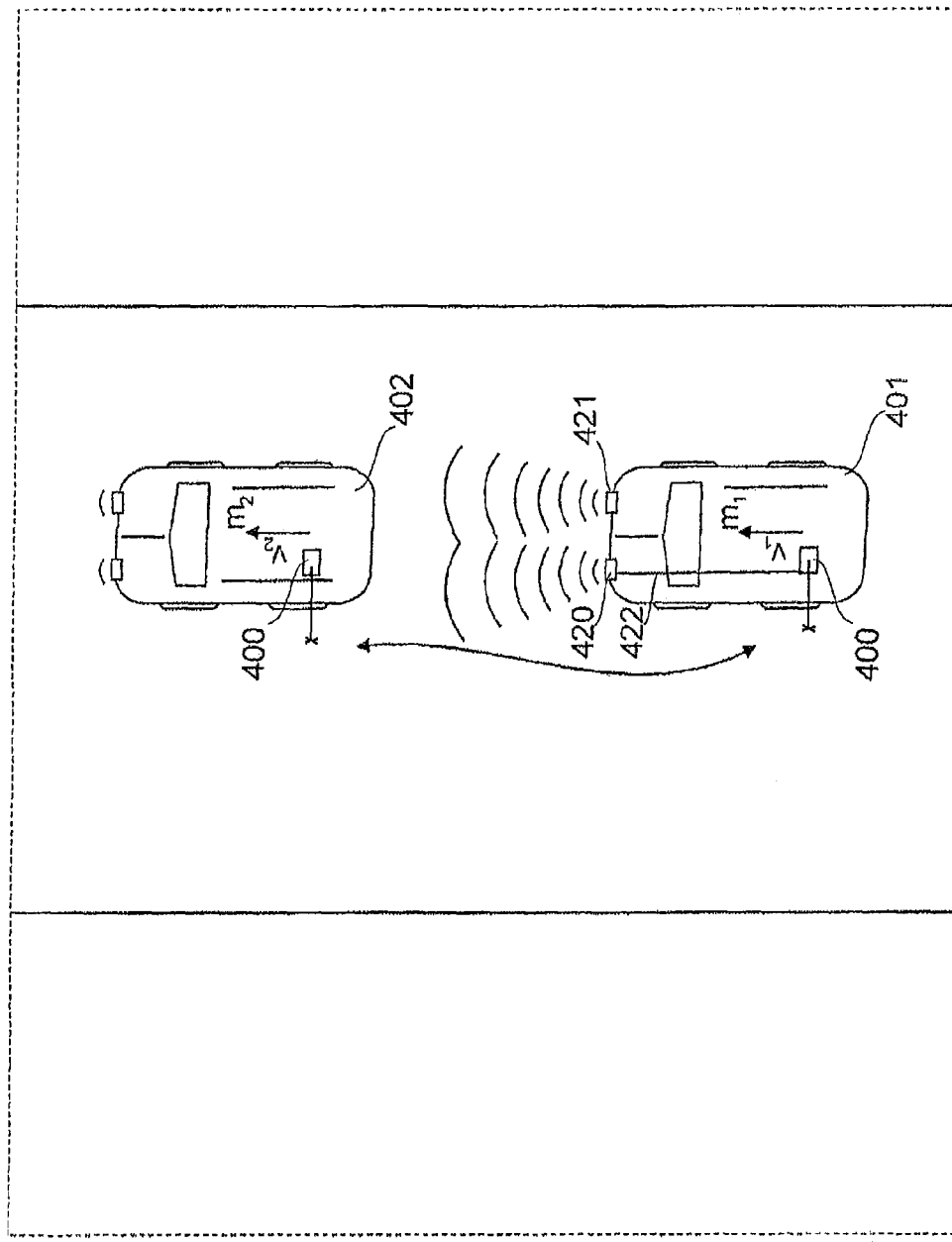
FIG. 4 shows further motor vehicles with communication apparatuses based on radio key for forwarding vehicle-to-X communication data before a vehicle collision.

FIG. 4 shows two vehicles which are each equipped with a communication device 400 and a radio key device. The vehicle 401 uses ambient sensor systems 420, 421 to recognize an unavoidable crash with the vehicle 402. The ambient sensor system 420 can use the connecting line 422 to forward data to the communication device 400.

The vehicle 401 uses radio key technology to send the information about the imminent collision and its own mass $m_1$ to the vehicle 402. The latter can in turn return its mass $m_2$. This information can then be used by both vehicles to better condition their passive safety systems. In addition, the vehicle 401 can send a possible angle of impact or a possible impact speed $v_1$ to the vehicle 402 so as also to use this information for a passive safety system. In order to be able to accurately determine the distance and angle of impact, it is possible to use technologies in the vehicle 402, such as distance measurement by means of field strength measurement, and also a digital compass, which ascertains the direction of travel. It is thus possible to establish very accurately where the vehicle 401 is situated in relation to the vehicle 402. The speeds $v_1$ and $v_2$ can therefore be used in suitable program elements of a program, and the data concerning the imminent accident can be forwarded and evaluated. It is thus possible to establish whether the other vehicle presents a hazard.

In addition, data relating to the roadway (whether wet or icy) can also be captured by suitable sensors in order to calculate the braking distance using a computer program and to stipulate whether a collision is actually imminent. In addition, other vehicles could also be involved so that they can be warned about the accident.

Figure 5:
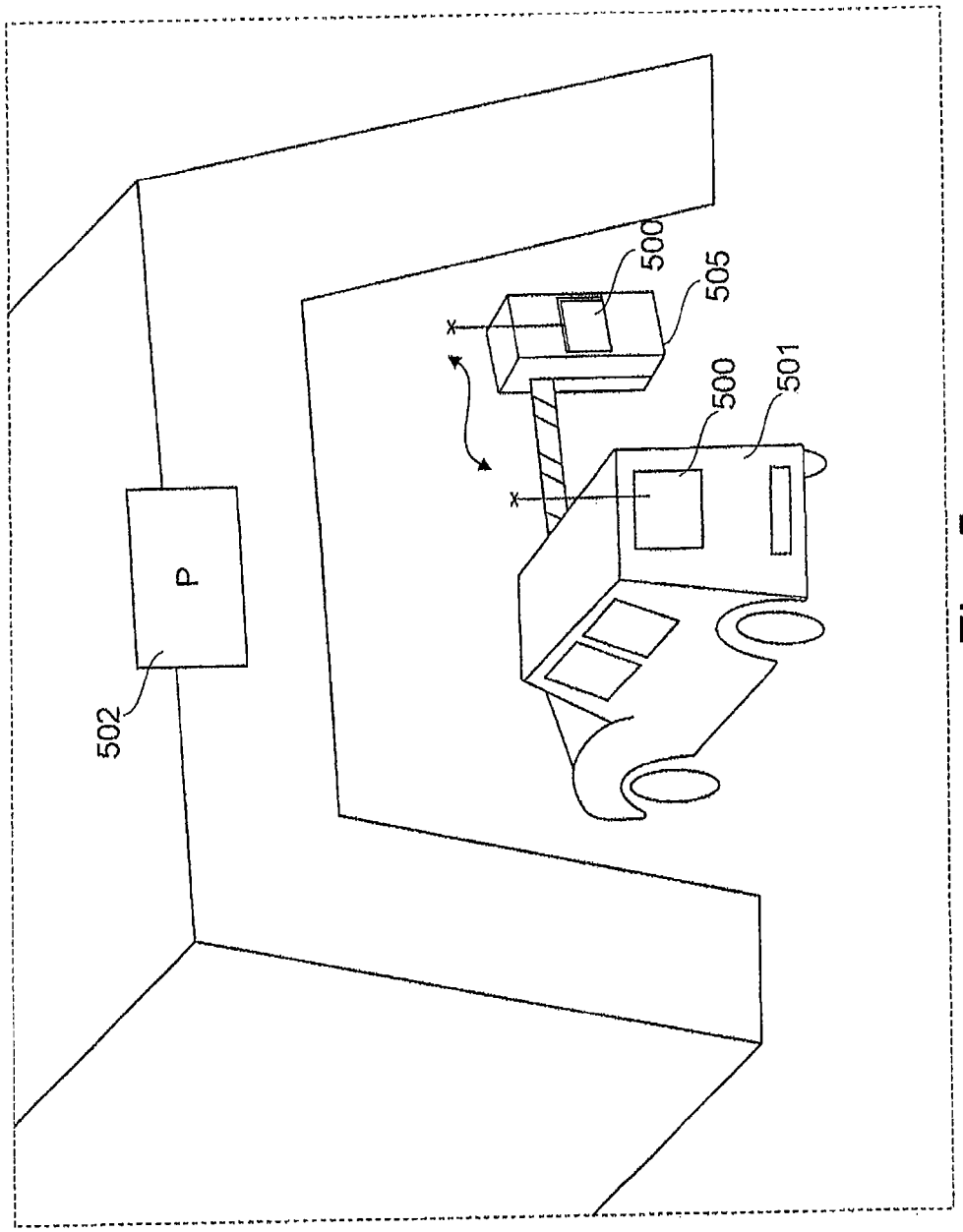
FIG. 5 shows a further motor vehicle with a radio-key-based communication apparatus for paying multistory car park charges.

FIG. 5 shows a vehicle 501 which is entering a multistory car park 502. The multistory car park 502 is equipped with radio key technology. This means that the payment for the multistory car park can be handled by means of radio key communication, the radio key device 500 being installed in the entrance barrier 505 in the multistory car park. The vehicle 501 likewise has a radio key device 500 which can communicate with the radio key device 500 in the multistory car park barrier system 505 in order to be able to make the payment wirelessly. In this case, the multistory car park 502 works in similar fashion to in toll systems. Payment services at other locations, such as bridges, can also be made possible in this manner.

Figure 6:
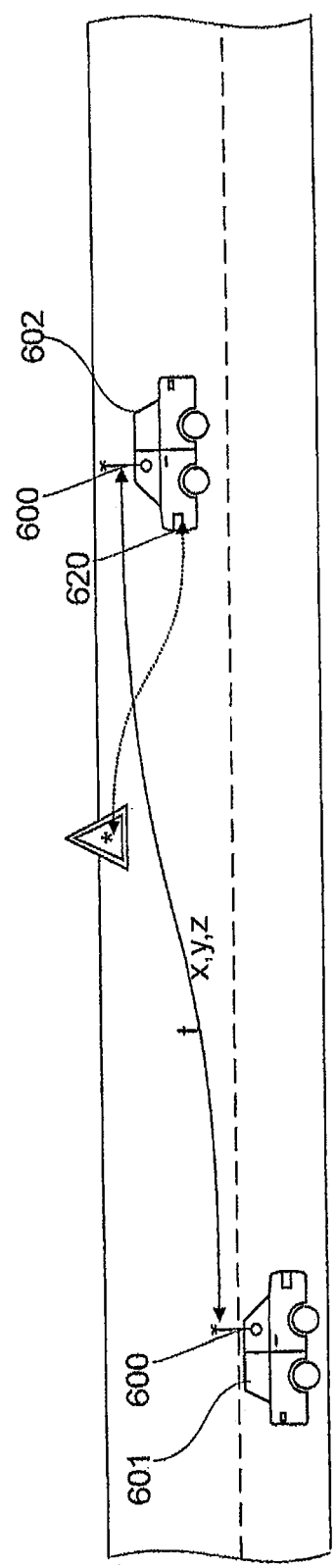
FIG. 6 shows further vehicles equipped with a radio key communication apparatus for forwarding vehicle-to-vehicle communication data.

FIG. 6 shows two vehicles 601 and 602 which are equipped with radio key devices 600. These can forward information about the road condition, such as wet conditions or black ice (symbolized by a slippery road warning triangle), which can be captured by means of a sensor system 620 (dotted arrow). A radio key device 600 can forward this information for warning purposes to vehicle 601, including a time stamp (t) and a position (x; y; z) (see double-headed arrow). This advice can be forwarded to other road users, if appropriate, using store and forward information.

In addition, identification identifiers can be forwarded by means of the radio key technology. Thus, by way of example, emergency vehicles can obtain different information in encrypted form than normal road users. Using the radio technology by means of radio key, it is also possible to forward information from permanently installed points to the road users, for example information from sign gantries. In this way, the road users can be warned in good time about queues or other unforeseen events, such as heavy rain showers.

Figure 7:
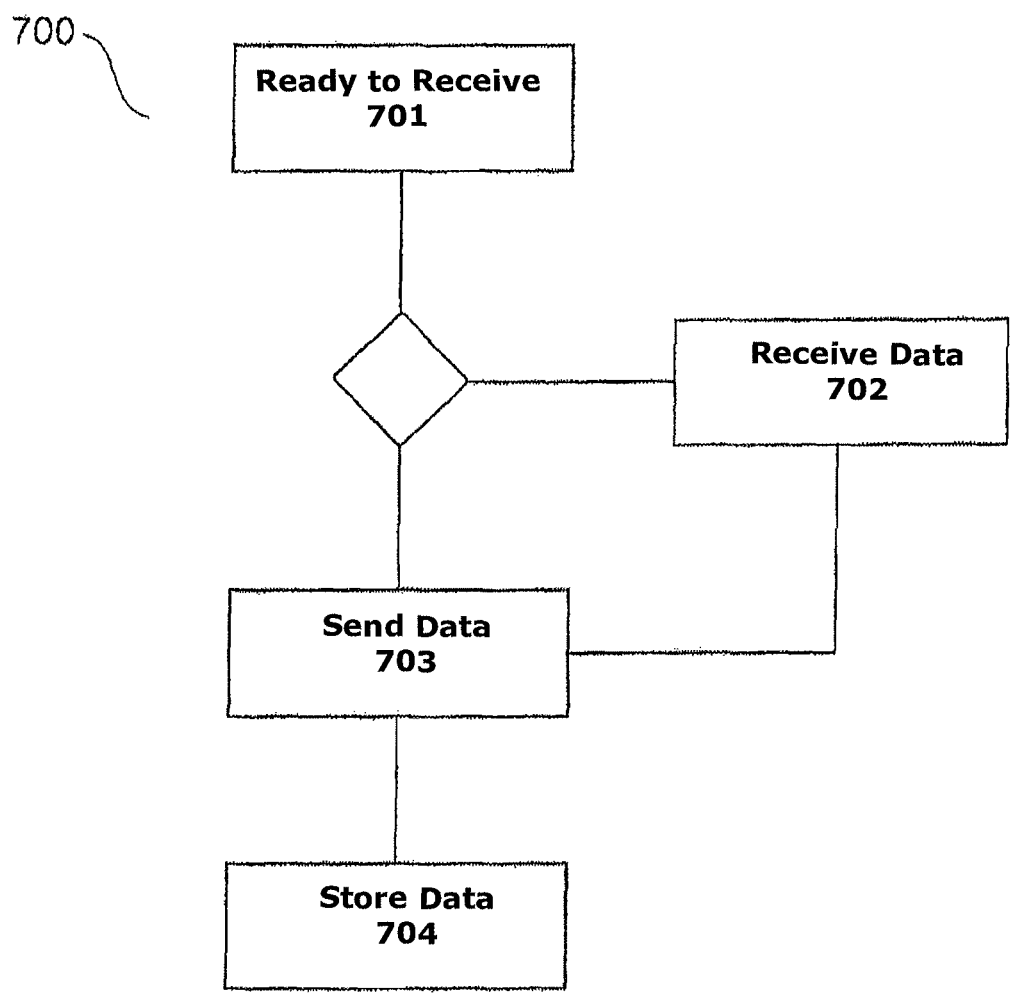
FIG. 7 shows a schematic view of a method according to an exemplary embodiment of the invention.

FIG. 7 shows a method 700 for vehicle-to-X communication with a radio key device having the following steps: in the first method step 701, the radio key is ready to receive data for wireless driving authorization. These data can be sent by a portable module for keyless driving authorization.

When a further vehicle or infrastructure unit is present with the same communication technology in range of the radio key, method step 702 can be performed, namely receiving vehicle-to-X communication data from another transmitter.

The received data or data situated in the memory can be sent in method step 703. Data can naturally also be sent if no communication or reception has previously taken place with another vehicle or infrastructure unit. As a final method step 704, the data can be stored for a store and forward function.

In addition, it should be pointed out that "comprising" and "having" does not exclude other elements or steps, and "a" or "an" does not exclude a large number. It should also be pointed out that features or steps which have been described with reference to one of the above exemplary embodiments can also be used in combination with other features or steps from other exemplary embodiments described above. Reference symbols in the claims should not be regarded as a restriction.

What is claimed:

1. A communication apparatus for radio key vehicle-to-X communication for a vehicle, said communication apparatus comprising:
   a radio key device (RKE) having
   a vehicle module, and
   a portable module;
   wherein at least one of the vehicle module and the portable module have a transceiver which is designed for:
   wirelessly receiving vehicle-to-X communication data from a first vehicle or a first infrastructure,
   storing the received vehicle-to-X communication data, and
   sending the stored vehicle-to-X communication data to a second vehicle or a second infrastructure in response to the second vehicle or the second infrastructure being in a wireless range of the transceiver.

2. The communication apparatus as claimed in claim 1, also comprising:
   an interface to a position-finding unit for creating position data for a vehicle.

3. The communication apparatus as claimed in claim 2, wherein the vehicle is an emergency vehicle which, after finding an accident scene, sends its position data as a locating signal via the communication apparatus to further emergency vehicles for the purpose of coordinating the operation.

4. The communication apparatus as claimed in claim 3, also comprising a vehicle-based navigation system which is designed to receive the locating signal and to display destination guidance on a digital map on a display apparatus.

5. The communication apparatus as claimed in claim 1, wherein the vehicle-to-X communication data are selected from the group consisting of:
   position data;
   time stamps;
   surroundings data;
   warning signals;
   identifier data;
   speed data; and
   direction data.

6. The communication apparatus as claimed in claim 1, wherein at least one vehicle also has:
   a display apparatus which is designed to receive and display vehicle-to-X communication data.

7. The communication apparatus as claimed in claim 1, wherein the vehicle-to-X communication data can additionally also be received and transmitted on the basis of a further communication technique with a higher bandwidth from the transceiver on the basis of a standard format, and
   wherein the further communication technique is selected from the group consisting of:
   WLAN engineering based on IEEE 802.11 standards;
   cellular radio based on GSM, UMTS, LTE, Wimax; and
   communication technique based on DSRC.

8. The communication apparatus as claimed in claim 7, wherein the vehicle-to-X communication data comprise an identifier which indicates what further communication technique is integrated in a transmitter.

9. The communication apparatus as claimed in claim 1, also comprising a memory unit for providing vehicle-to-X communication data.

10. The communication apparatus as claimed in claim 1, also comprising:
    a microprocessor for processing the vehicle-to-X communication data and for executing communication stacks,
    wherein the vehicle-to-X communication data have a standard format for an intelligent transportation system (ITS).

11. The communication apparatus as claimed in claim 1, wherein customization of keyless software can be executed by means of the portable module and/or direct radio communication to the vehicle module.

12. The communication apparatus as claimed in claim 11, wherein a keyless driving authorization has a mid-range or long-range front end.

13. A vehicle having a communication apparatus as claimed in claim 1.

14. A method for radio key vehicle-to-X communication with a radio key device including a portable module and a vehicle module, said method comprising:

receiving vehicle-to-X communication data from a first vehicle or a first infrastructure by a transceiver in at least one of the portable module and the vehicle module;

storing the received vehicle-to-X communication data in a memory of at least one of the portable module and the vehicle module; and transmitting the stored vehicle-to-X communication data to a second vehicle or a second infrastructure in response to the second vehicle being in wireless range of the transceiver.

15. A non-transitory computer-readable medium which stores a program which, when executed on a radio key device, instructs the radio key device to perform the method steps as claimed in claim 14.

* * * * *